United States Patent [19]

Kraft et al.

[11] 4,364,465
[45] Dec. 21, 1982

[54] COLLATING CONVEYOR SYSTEM

[75] Inventors: George R. Kraft, Clifton, N.J.; Albert V. Cole, Houston, Tex.; Henry E. Kimbrel, Fayetteville, Ga.

[73] Assignee: Nabisco, Inc., East Hanover, N.J.

[21] Appl. No.: 188,715

[22] Filed: Sep. 19, 1980

[51] Int. Cl.³ .............................................. B65G 47/10
[52] U.S. Cl. ..................................... 198/452; 198/598
[58] Field of Search ...................... 198/367, 448.9, 451, 198/452, 491, 492, 447, 597, 598, 634, 637, 366, 456, 457, 442

[56] References Cited

U.S. PATENT DOCUMENTS

| | | | |
|---|---|---|---|
| 1,729,671 | 10/1929 | Bell-Irving et al. | 198/367 |
| 2,670,835 | 3/1954 | Huttmann | 198/442 |
| 2,744,610 | 5/1956 | Stiles | 198/491 X |
| 2,996,855 | 8/1961 | Bergeron et al. | 198/449 |

*Primary Examiner*—John J. Love
*Assistant Examiner*—Douglas D. Watts
*Attorney, Agent, or Firm*—Gerald Durstewitz

[57] ABSTRACT

A collating conveyor arrangement in which two conveyors have closely spaced parallel sections provided with dam mechanisms for forming articles into groups and alternately releasing the groups. An on-edge transfer conveyor is pivotally positioned above the parallel conveyor sections to selectively extend obliquely across one of the parallel sections to direct the groups formed on one conveyor into spaces between the groups formed on the other conveyor.

7 Claims, 8 Drawing Figures

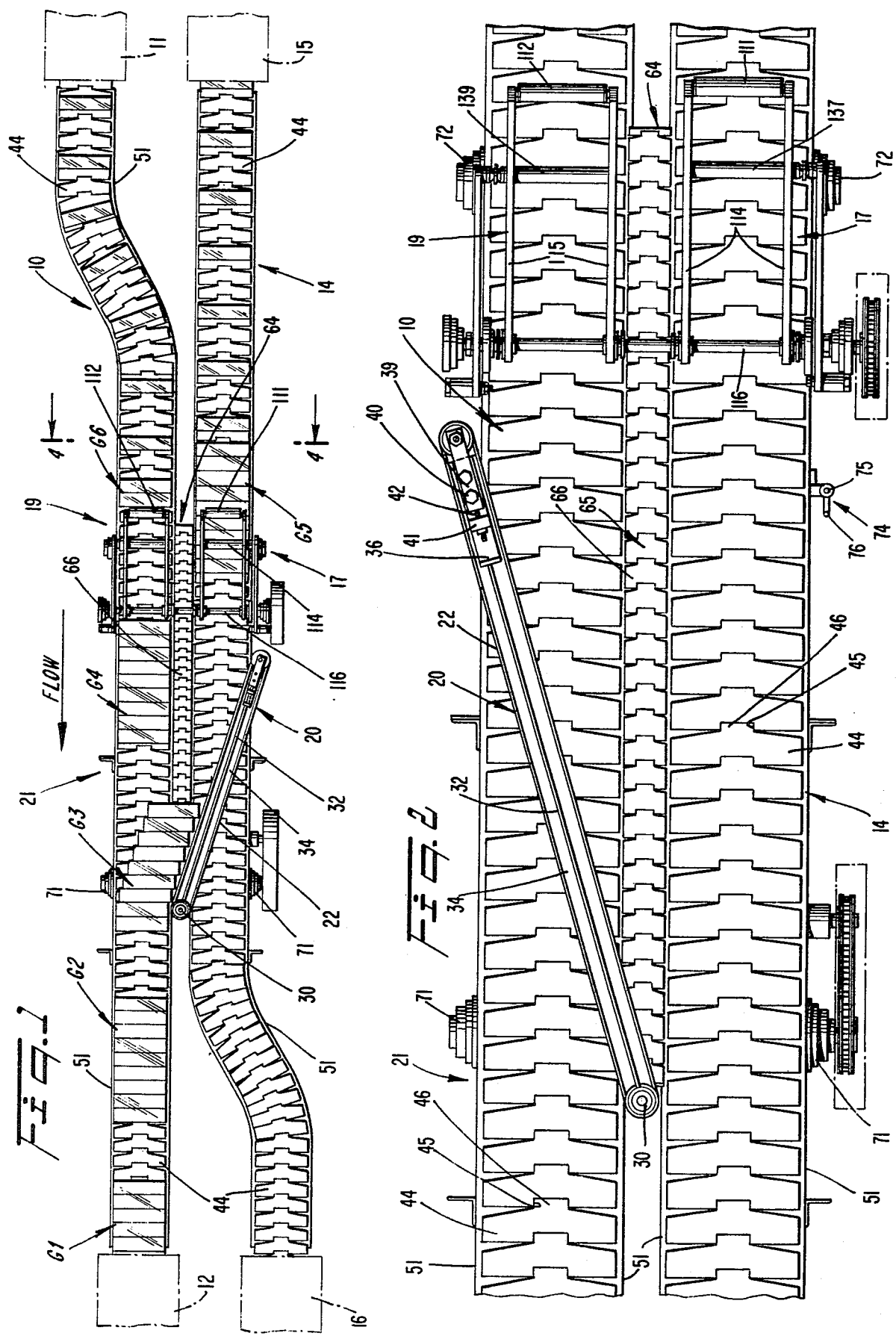

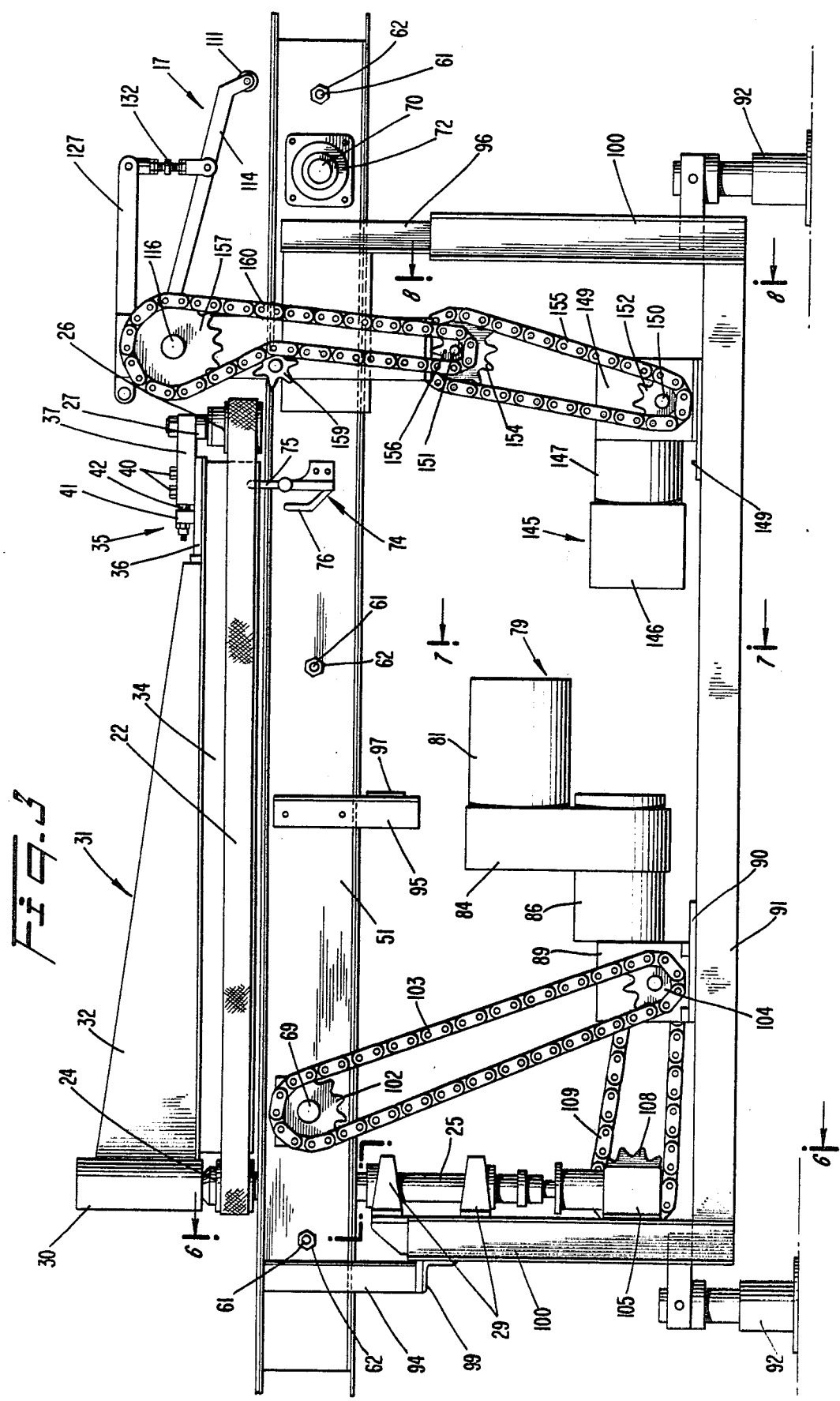

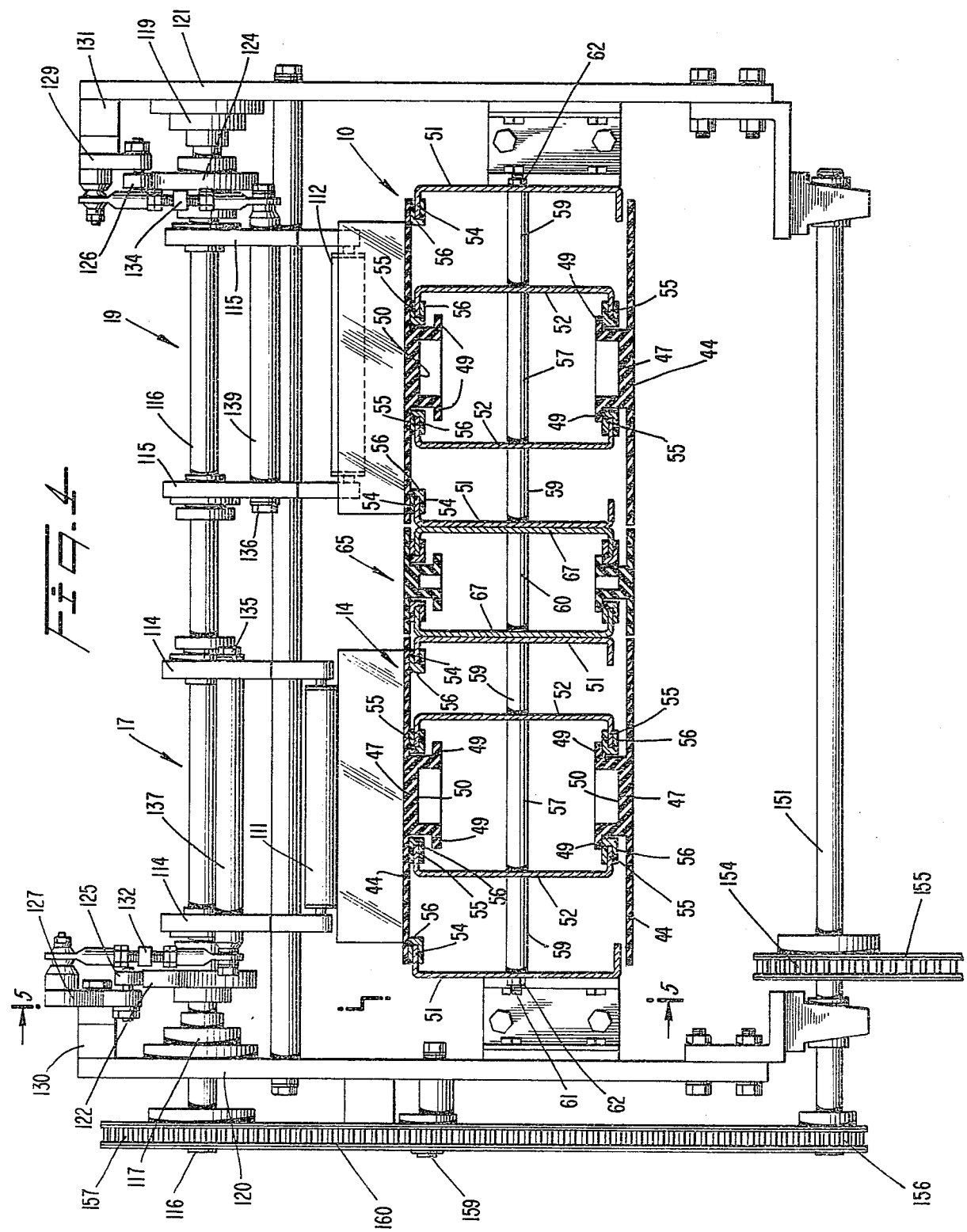

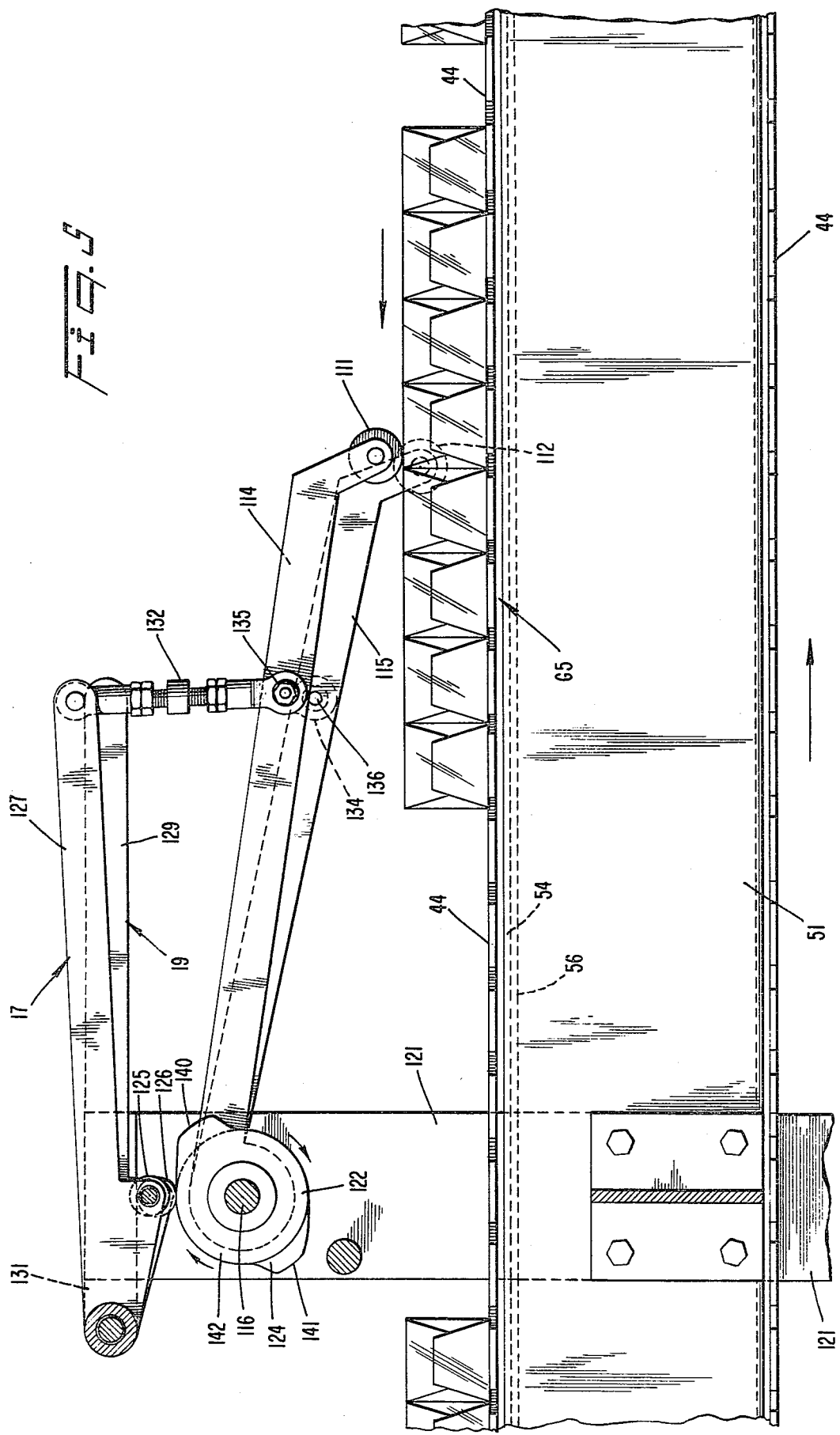

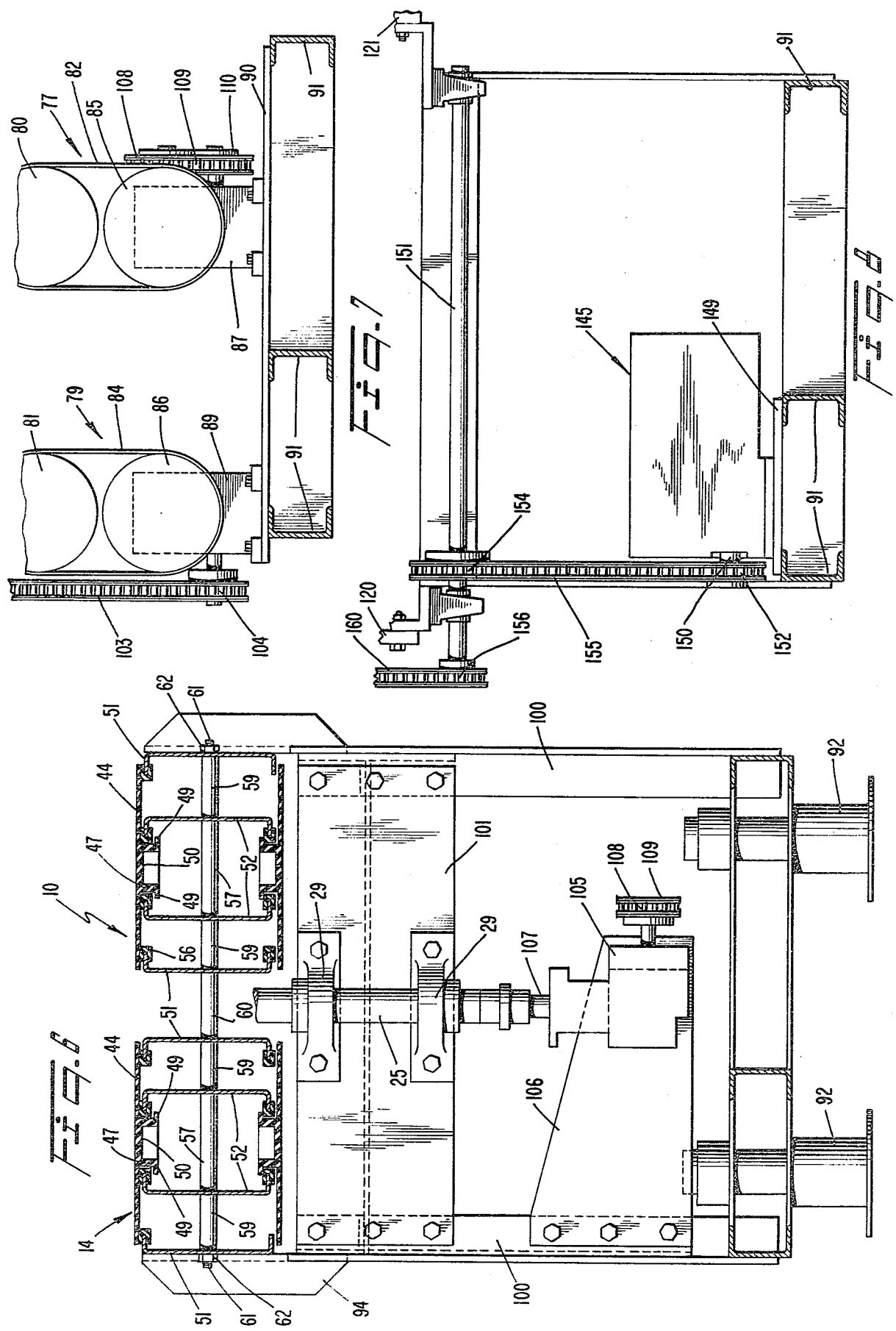

COLLATING CONVEYOR SYSTEM

BACKGROUND OF THE INVENTION

The present invention generally relates to the packaging of cracker-type baked goods, and, in particularly to conveyor systems for collating plural flows of wrapped slugs of crackers (or the like) to provide a single flow to a subsequent packaging operation.

Baked goods which are slug wrapped are commonly packaged in cardboard cartons, a specific number of slugs being loaded into each carton. The carton loading machines are designed to handle the output of a plurality of slug wrapping machines. Since each carton loader is fed by a single conveyor, the flow of slugs from a number of slug wrappers must be combined on the single infeed conveyor.

It is frequently desirable to provide slug wrapped products in packages of different sizes. For example, it is common to provide such products in a carton which contains two slugs and in a larger carton which contains four slugs.

Each carton loading machine handles only one size carton. Therefore, it is necessary to be able to combine the output of the slug wrappers on either of two conveyors, each leading to a different carton loader.

In the prior art arrangements, the slugs leaving the slug wrappers are oriented longitudinally on the conveyors. The input conveyors from two slug wrappers extend parallel to each other up to a horizontal plate. The input conveyors deliver their slugs onto the plate in side by side relationship. The momentum of the slugs cause them to slide across the plate and impact against a stop arranged perpendicular to their direction of travel.

At the instant of impact, an overhead sweep mechanism moving at right angles to the slugs sweeps the slugs off the plate onto one of two out put conveyors. The output conveyors extend from opposite side edges of the plate, at right angles to the input conveyors. The output conveyors each lead to a carton loader for a different size carton.

Mechanisms are provided on the input conveyors to regulate the product flow on each of these conveyors so that the leading ends of two parallel slugs (one on each conveyor) hit the stop simultaneously and in synchronism with the overhead sweep mechanism.

Experience has shown that this arrangement is subject to malfunctions. Since the slugs are oriented on the conveyor parallel the their direction of travel, the conveyor must move very rapidly to keep the carton loaders operating at capacity. This high speed operation of the conveyors makes the synchronism of the overhead sweep mechanism critical.

If the slugs, when they impact against the stop, are out of alignment with their direction of travel (even minutely), they will pivot on the plate, disrupting the smooth flow product. It is necessary, therefore, that the overhead sweep mechanism pick off the slug just at the point of impact.

SUMMARY OF THE INVENTION

Accordingly, it is an object of the present invention to provide an improved conveyor system for combining the product flow of two conveyors.

It is another object to provide such a system for combining the product flow of the two conveyors onto either of these conveyors.

The foregoing objects are accomplished by providing a collating conveyor arrangement comprising a pair of conveyors having parallel sections separated by a space, an on-edge conveyor above the parallel sections positioned to direct articles obliquely from one of the parallel conveyor sections to the other, dam mechanisms on the parallel sections upstream of the on-edge conveyor for controlling the flow of articles, and means for operating the dam mechanisms to feed groups of articles alternately down the parallel sections toward the on-edge conveyor, the on-edge conveyor being pivoted at one end about a vertical axis extending into the space between the parallel sections for movement between a first position extending diagonally across one of the parallel sections and a second position extending diagonally across the other parallel section.

BRIEF DESCRIPTION OF THE DRAWINGS

A preferred embodiment of the invention has been chosen for purposes of illustration and description and are shown in the accompanying drawings, forming a part of the specification, wherein:

FIG. 1 is a top plan view of a conveyor system according to the present invention.

FIG. 2 is an enlarged plan view of the product transfer section of the conveyor system shown in FIG. 1.

FIG. 3 is a front elevational view of the transfer section shown in FIG. 2.

FIG. 4 is sectional view taken along the line 4—4 on FIG. 1.

FIG. 5 is an elevational view taken along line 5—5 on FIG. 4.

FIG. 6 is a sectional view taken along line 6—6 on FIG. 3.

FIG. 7 is a sectional view taken along line 7—7 on FIG. 3.

FIG. 8 is a sectional view taken along line 8—8 on FIG. 3.

DESCRIPTION OF THE PREFERRED EMBODIMENT

Referring to the drawings in detail, there is shown a conveyor system according to the present invention which includes a conveyor 10 extending from a slug wrapping machine 11 to a carton loading machine 12, a second conveyor 14 extending from a second slug wrapping machine 15 to a second carton loading machine 16, a pair of product dam mechanisms 17 and 19, a transfer conveyor 20, and apparatus for operating the dam mechanisms.

The product dam mechanisms 17 and 19, the transfer conveyor 20, and the dam mechanism operating apparatus are incorporated in a transfer and collating station 21 through which each of the conveyors 10 and 14 pass. Within the station 21, the conveyors 10 and 14 are straight, parallel and spaced from each other.

The transfer conveyor 20, as shown particularly in FIGS. 1, 3, 4 and 6 includes an on-edge endless belt 22 extending between a pulley 24, which is mounted on a long vertical shaft 25, and a pulley 26, which is mounted on a short vertical shaft 27. The shaft 25 is positioned between the conveyors 10 and 14 and is journalled in a pair of bearings 29.

A cylindrical formation 30 is journalled on the upper end of the shaft 25 and carries an arm 31 which supports the shaft 27. The arm 31 comprises a triangular plate 32 projecting from the formation 30 and a channel beam member 34 welded to the lower edge of the triangular plate 32. The shaft 27 is attached to the arm 31 by means of an adjustable mounting 35 that includes a plate 36 welded to the member 34 and a bar 37 is adjustably mounted on the plate 36. The bar 37 is formed with a longitudinal slot 39. Two bolts 40 extend through the slot 39 into threaded holes in the plate 36. The plate 36 is formed with a flange 41 through which a jack screw 42 is threaded. The jack screw bears against the end of the bar 37 and is used to position the bar to obtain the desired tension in belt 22.

The conveyors 10 and 14 shown are of conventional design and consist of a series of flat, generally rectangular links 44, each of which is formed with a notch 45 on one edge and a tab 46 on the opposite edge. The tab 46 of each link extends into the notch 45 of the next link and the links are interconnected by a pin (not shown) extending through a bore in the tab. To enable the conveyors to negotiate flat turns, the connecting pin is of somewhat smaller diameter than the bore in the tab, and the links (in plan view) taper toward their outer edges. As shown in FIGS. 4 and 6, the links are a pair of outwardly extending flanges 49 and a central cavity 50. As shown in FIG. 6, the belts of interconnected links of conveyors 10 and 14 are each supported by a pair of outer channel beam members 51 and a pair of inner channel beam members 52. The upper flight of the belts 10 and 14 slide on the upper edge walls 54 of the outer channel members and on the upper edge walls 55 of the inner channel members, each of which is covered by a plastic strip 56 to protect the links from wear. The lower flight of the conveyor belts are supported by the flanges 49 which ride on the lower edge walls 55 of the inner channel members.

A tubular spacer 57 separates the inner channel beam members 52 of each conveyor and the members 52 are separated from the outer members 51 by tubular spacers 59. Another tubular spacer 60 is positioned between the adjacent members 51 of the two conveyors. The spacers are positioned in alignment with each other and with holes in the channel members and a rod 61 extends through all of the spacers. Nuts 62 are threaded on to the ends of the rod 61 to hold the conveyor pieces together.

Within the transfer and collecting station 21, a narrow conveyor 64 is positioned between the conveyors 10 and 14, as shown in FIGS. 1, 2 and 4. The narrow conveyor includes a narrow belt 65 made from links 66. The belt is supported by a pair of channel members 67 that are positioned between, and attached to, the adjacent channel members 51 of the conveyors 10 and 14.

The conveyor belt 65 extends between a pair of sprocket wheels (not shown) mounted on shafts 69 and 70 which are journalled in bearings 71 and 72 (FIG. 2) mounted on the outside channel beams 51.

Also mounted on each of the outside channel beams 51, as shown in FIGS. 2 and 3, is a lock mechanism 74 for locking the conveyor in a position extending diagonally across the conveyor 14, as shown in FIG. 1, or in a position extending diagonally across the conveyor 10, as shown in FIG. 2.

Each of the mechanisms 74 are a standard cam operated detent in which a vertical locking pin 75 rests on an internal cam. The cam is rotated to raise and lower the pin 75 by moving the lever handle 76. When the conveyor 20 is in place and the handle 76 is operated, the pin 75 moves into an opening (not shown) in lower flange of the channel beam 34.

The transfer conveyor 20 and the narrow conveyor 64 are driven by a pair of motor units 77 and 79 positioned side by side beneath the conveyors 10 and 14, as shown in FIG. 7. The motor units 77 and 79 respectively include a motor 80 and 81, a gear train 82 and 84, a speed control unit 85 and 86, and a right angle gear box 87 and 89. The motor 81 is reversible to allow the conveyor 20 to be driven in either direction. The units 77 and 79 are mounted on a plate 90 carried by channel frame members 91. Other frame members of the transfer and collecting station 21 include four supporting pedestals 92, angle iron sections 94, 95 and 96 attached to each side of the outer channel beams 51, across brace plate 97 extending between the angle irons 95, an angle iron cross brace 99, at the base of the angle iron sections 94, vertical frame members 100 extending up from the members 91, and a plate 101 extending between two of the members 100 across the station 2.

The conveyor 64 is driven by the motor unit 79 through a sprocket wheel 102 on the shaft 69, a chain 103, and a sprocket wheel 104 on the output shaft of the right angle gear box 89.

The conveyor belt 22 is driven by the motor unit 77 through a right angle gear box 105 mounted on a vertical plate 106 at the bottom of the shaft 25. The output shaft 107 of the box 105 is locked to the end of the shaft 25. The input shaft of the box carries a sprocket wheel 108 that is driven by a chain 109 and a sprocket wheel 110 on the output shaft of the right angle gear box 87.

The dam mechanisms 17 and 19 each include a product engaging roller 111 and 112 respectively. The roller 111 is mounted to the ends of a pair of pivoted arms 114 and the roller is similarly mounted to a pair of arms 115. The arms 114 and 115 are pivotally mounted on a driven shaft 116. This shaft is journalled in bearings 117,119 near the top of vertical frame plates 120,121 that are mounted on the outermost channel members 51.

Between the vertical frame plate 120 and the dam mechanism 17 there is a cam 122 mounted on the shaft 116. A second cam 124 is mounted on the shaft 116 between the dam mechanism 19 and the frame plate 121. These cams are locked to the shaft 116 to rotate therewith.

As shown in FIGS. 4 and 5, the cams 122 and 124 act against cam follower wheels 125 and 126 carried by lever arms 126 and 129. The lever arms 127,129 are pivotally mounted on studs 130,131 extending inwardly from the frame plates 120 and 121. The ends of the lever arms 127,129 are connected to the arms 114,115 by adjustable linkages 132, 134. The lower end of the linkages 132,134 are fastened to the pivoted arms by means of a long bolt 135,136 which extend through the arms 114,115 and through a tubular spacer 137,139 positioned between the arms.

The cams 122 and 124 each have a single lobe 140,141. The remainder of the cam surfaces define circular arcs 142 which are concentric with the shaft 116. The cams 122 and 124 are oriented so that their lobes are 180 degrees out of phase.

The shaft 116 is driven by a motor unit 145, comprising a motor 146, a gear train 147 and a speed control unit 148 mounted on a plate 149. The output shaft 150 of the speed control unit drives an intermediate shaft 151 by means of sprocket wheels 152,154 and a chain 155. The shaft 151 in turn drives the shaft 116 through sprocket wheels 156 and 157, an idler sprocket 159 and a chain 160.

In operation, FIG. 1 shows the transfer conveyor 20 positioned extending across the conveyor 14. The reversible motor 81 driving the conveyor 20 is set to drive the conveyor in a counterclockwise direction. The collating and transfer station 21 thereby moves the output of the slug wrapper 11 from the conveyor 10 to the conveyor 14 and combines it with the output of the slug wrapper 15 for delivery to the carton loader 16.

The wrapped slugs P, as they issue from the slug wrappers 11 and 15, are positioned crosswise of the conveyors and are spaced at considerable intervals. The spacing of the slugs is not precise since it is affected by variation in rate at which product is supplied to the slug wrappers and by changes in tension in the web or wrapping material being delivered to the slug wrappers.

When the dam mechanisms 17,19 are in their lowest position, the rollers 111,112 engage the side of the next slug moving down the conveyor 10,14 and prevents it from moving with the conveyor toward the carton loader 12,16. The successive slugs pile up behind the first slug and form a group G which continues to build until the cam lobe 140,141 rotates the arm 127,129 to lift the roller out of the path of the slugs.

In FIG. 1 in the groups G1 and G6 are numbered in the sequence in which they reach the carton loader 12. Groups G1, G3 and G5 were formed by the dam mechanism 17 and groups G2 and G4 were formed by the dam mechanism 19. Group G6 is shown in the process of being formed behind the roller 112 of the mechanism 19.

In FIGS. 1, 4 and 5 the system is shown at a point in time shortly after the dam 17 has been lifted to permit the group G1 to proceed toward the transfer conveyor 20. The dam 19 is shown in its lowest position with the group G6 being formed against the roller 112.

With reference to FIG. 5, when one of the lobes (140,141) engages the associated cam follower wheel (125,126) the roller (111,112) is lifted clear of the first slug of the group formed and that group is carried by the conveyor (14,10) under the roller (111,112) as the lobe moves past the wheel (125,126), the roller (111,112) is lowered into contact with the top surface of the groups and rides along this surface to the end of the group. The roller then drops to its lowest position and engages the leading edge of the next slug to begin the formation of the next group. The dam mechanisms 17 and 19 operate alternately so that the groups formed on the two conveyors are staggered with respect to each other.

When the slugs in the groups that are formed on the conveyor 14 engage the transfer conveyor 20, they are gradually slid transversely from the conveyor 14 across the narrow conveyor 64 onto the conveyor 10 into a space provided between successive groups formed on that conveyor. The conveyors 10, 14 and 64 all move at identical speeds so that there is no twisting of the slugs as they transfer from one conveyor to another.

When it is desired to place the output of both slug wrappers 11 and 15 on the conveyor 14, the lock mechanism 74 is operated to release the end of the conveyor 20 and the conveyor is pivoted to a position extending across the conveyor 10. The lock mechanism 74 on that side of the conveyor is operated to lock the conveyor 20 in place, and the motor 81 is reversed to move the belt in a clockwise direction.

When it is desired to use the conveyors 10 and 14 independently to deliver slugs to both carton loaders 12 and 16, the conveyor 20 can be centrally positioned over the conveyor 64. In this situation the conveyor 64 is turned off and, if necessary, the free end of the conveyor can be held in place by a wedge placed on that narrow conveyor.

It will be seen from the foregoing that the present invention provides an improved conveyor system for combining the product flow of two conveyors.

We claim:

1. A collating conveyor arrangement comprising in combination first and second conveyors having parallel sections separated by a space, a third conveyor above said parallel sections of said first and second conveyors and positioned on-edge to direct articles obliquely from one of said parallel conveyor sections to the other, first and second dam mechanisms upstream of said on-edge conveyor for respectively controlling the flow of articles along said first and second conveyors, and means for operating said dam mechanisms to feed groups of articles alternately down said first and second conveyors toward said on-edge conveyor, said on-edge conveyor having a first end positioned above said space between said first and second conveyors, and said on-edge conveyor being pivoted about a vertical axis extending into said space for movement of the conveyor between a first position extending diagonally across first conveyor and a second position extending diagonally across said second conveyor, wherein said dam mechanisms include first and second pivoted arm assemblies mounted respectively above said first and second conveyors, said arm assemblies each including a roller mounted at the free end thereof, said arm assemblies being moveable between a lower position and an upper position, in said lower position said roller being positioned to engage the leading edge of and article on the conveyor associated with that arm and thus form a group of articles having a continuous top surface, in said upper position said roller is moved out of engagement with the leading edge of the engaged article to allow the group to move down the conveyor, and wherein said dam operating means includes first and second cam means for periodically raising said first and second arm assemblies respectively to said upper position briefly to release the group of articles and then lower the assembly to place the roller onto the continuous top surface of the group, whereby the assembly drops to the lower position when the last article in the group formed moves past the roller.

2. Apparatus according to claim 1 including a fourth conveyor in said space between said first and second conveyors and beneath said third conveyor, said fourth conveyor being driven at a speed equal to that of the first and second conveyors.

3. Apparatus according to claim 2 wherein said third conveyor includes a shaft extending vertically between said first and second conveyors, means for driving said shaft, an arm having one end pivotally mounted on the upper end of said shaft and having a free end, first pulley means mounted on said shaft below said arm to rotate with said shaft, second pulley means mounted on the free end of said arm, a conveyor belt mounted on said first and second pulley means to extend horizontally just above the surface of the first, second and third conveyors, and means for selectively locking said third conveyor in either said first or said second position.

4. Apparatus according to claim 3 wherein each of said arm assemblies includes horizontal shaft means above the associated conveyor, a pair of parallel arms each pivoted on said shaft means and having a free end, said roller being positioned between the free ends of said arms.

5. Apparatus according to claim 4 wherein each of said first and second dam operating cam means includes a cam mounted on the shaft of the associated arm assembly for rotation therewith, means for driving said arm assembly shaft to rotate said cam, a lever pivoted at one end and attached to the associated arm assembly at the other end, and a cam follower mounted on said lever and engaging said cam to move said assembly between said lower and upper positions.

6. Apparatus according to claim 4 wherein said lever is connected to said arm assembly by means of an adjustable linkage.

7. Apparatus according to claim 5 wherein said first and second arm assemblies share a common horizontal shaft.

* * * * *